United States Patent
Lee et al.

(10) Patent No.: US 10,784,499 B2
(45) Date of Patent: Sep. 22, 2020

(54) POSITIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventors: Dae-Hoe Lee, Yongin-si (KR); Do-Hyung Park, Yongin-si (KR); Yong-Chan You, Yongin-si (KR); Min-Han Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 324 days.

(21) Appl. No.: 15/487,616

(22) Filed: Apr. 14, 2017

(65) Prior Publication Data
US 2017/0301908 A1 Oct. 19, 2017

(30) Foreign Application Priority Data
Apr. 15, 2016 (KR) ........................ 10-2016-0046341

(51) Int. Cl.
| | |
|---|---|
| *H01M 4/52* | (2010.01) |
| *H01M 4/131* | (2010.01) |
| *H01M 4/505* | (2010.01) |
| *H01M 4/525* | (2010.01) |
| *H01M 10/0525* | (2010.01) |
| *H01M 4/46* | (2006.01) |
| *H01M 4/50* | (2010.01) |

(52) U.S. Cl.
CPC .......... *H01M 4/131* (2013.01); *H01M 4/505* (2013.01); *H01M 4/525* (2013.01); *H01M 4/46* (2013.01); *H01M 4/463* (2013.01); *H01M 4/466* (2013.01); *H01M 4/50* (2013.01); *H01M 4/52* (2013.01); *H01M 10/0525* (2013.01); *H01M 2220/20* (2013.01)

(58) Field of Classification Search
CPC ........ H01M 4/131; H01M 4/525; H01M 4/46; H01M 4/466; H01M 4/505; H01M 4/463; H01M 4/50; H01M 4/52
See application file for complete search history.

(56) References Cited

U.S. PATENT DOCUMENTS

| | | | | |
|---|---|---|---|---|
| 2005/0175897 | A1* | 8/2005 | Jung | H01M 4/525 429/223 |
| 2011/0305947 | A1* | 12/2011 | Song | H01M 4/525 429/207 |
| 2015/0024275 | A1 | 1/2015 | Ishida et al. | |

FOREIGN PATENT DOCUMENTS

| | | |
|---|---|---|
| KR | 10-2011-0136687 A | 12/2011 |
| KR | 10-2014-0117311 A | 10/2014 |
| KR | 10-2015-0010556 A | 1/2015 |

* cited by examiner

*Primary Examiner* — Milton I Cano
*Assistant Examiner* — Kiran Akhtar
(74) *Attorney, Agent, or Firm* — Lee IP Law, P.C.

(57) ABSTRACT

A positive active material for a rechargeable lithium battery includes a compound represented by Chemical Formula 1, $Li_aNi_xCo_yMe_zM^1_kM^2_pO_2$ wherein, $0.9 \le a \le 1.1$, $0.7 \le x \le 0.93$, $0 < y \le 0.3$, $0 < z \le 0.3$, $0.001 \le k \le 0.006$, $0.001 \le p \le 0.005$, $x+y+z+k+p=1$, Me is Mn or Al, $M^1$ is a divalent element, and $M^2$ is a tetravalent element.

10 Claims, 8 Drawing Sheets

POSITIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2016-0046341, filed on Apr. 15, 2016, in the Korean Intellectual Property Office, and entitled: "Positive Active Material for Rechargeable Lithium Battery and Rechargeable Lithium Battery Including Same," is incorporated by reference herein in its entirety.

BACKGROUND

1. Field

Embodiments are directed to a positive active material for a rechargeable lithium battery and a rechargeable lithium battery including the same.

2. Description of the Related Art

A rechargeable lithium battery may be used as an actuating power source for a mobile information terminal such as a cell phone, a laptop, a smart phone, or the like, an electric vehicle, or the like.

SUMMARY

Embodiments are directed to a positive active material for a rechargeable lithium battery including a compound represented by Chemical Formula 1:

   [Chemical Formula 1]

wherein, $0.9 \leq a \leq 1.1$, $0.7 \leq x \leq 0.93$, $0 < y \leq 0.3$, $0 < z \leq 0.3$, $0.001 \leq k \leq 0.006$, $0.001 \leq p \leq 0.005$, $x+y+z+k+p=1$, Me is Mn or Al, $M^1$ is a divalent element, and $M^2$ is a tetravalent element.

$M^1$ may be Mg, Ba, or a combination thereof. $M^2$ may be Ti, Zr, Mn, Si, or a combination thereof.

In Chemical Formula 1, k and p may have a relationship such that $0.002 \leq k+p \leq 0.01$.

In Chemical Formula 1, k and p may be in a ratio k:p of about 2:8 to about 8:2.

A c-axis spacing in a crystal structure of the positive active material may be about 14.168 Å to about 14.174 Å.

A full width at half maximum, $FWHM_{(003)}$ of a diffraction peak at a (003) plane by X-ray diffraction of the positive active material may be about 0.13 to about 0.16.

$M^1$ may be Mg and $M^2$ may be Ti.

In Chemical Formula 1, x may be in a range of $0.8 \leq x \leq 0.9$.

Embodiments are also directed to a rechargeable lithium battery including a positive electrode including the positive active material as described above, a negative electrode including a negative active material, and an electrolyte

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
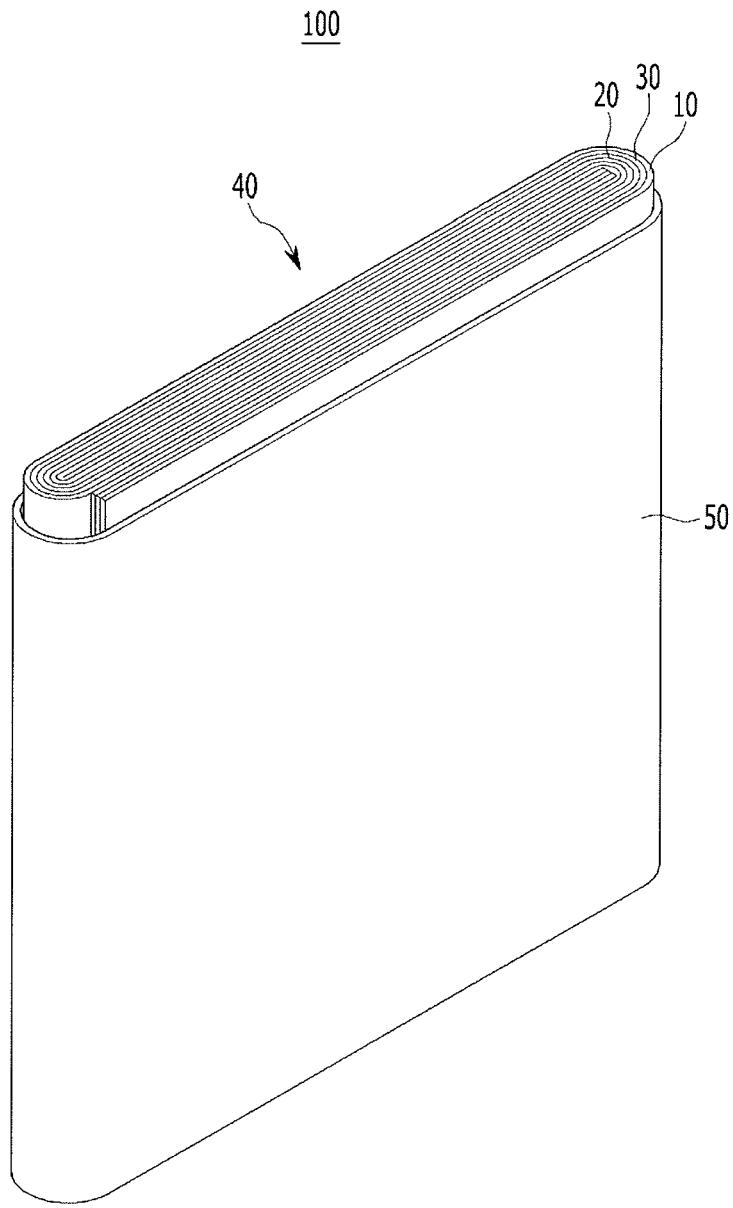
FIG. 1 illustrates a schematic view showing a structure of a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

A positive active material for a rechargeable lithium battery according to an embodiment may include positive active material for a rechargeable lithium battery including a compound represented by Chemical Formula 1.

   [Chemical Formula 1]

In Chemical Formula 1, $0.9 \leq a \leq 1.1$, $0.7 \leq x \leq 0.93$, $0 < y \leq 0.3$, $0 < z \leq 0.3$, $0.001 \leq k \leq 0.006$, $0.001 \leq p \leq 0.005$, $x+y+z+k+p=1$, Me is Mn or Al, $M^1$ is a divalent element and $M^2$ is a tetravalent element.

The positive active material may have a high nickel content, x of 0.7 to 0.93.

For example, in Chemical Formula 1, x may be in the range of $0.8 \leq x \leq 0.9$.

Such a compound of Chemical Formula 1 having a high nickel content, for example, where x is 0.7 to 0.93, may be a compound having high capacity. For example, the compound may have very high capacity compared with a compound having a low nickel content, for example, where x is less than 0.7.

According to embodiments, when the positive active material having a high nickel content further includes a divalent element $M^1$ and a tetravalent element $M^2$ as shown in Chemical Formula 1, the positive active material may have a stabilized structure such that an utilization ratio of lithium ions may be maintained. For example, capacity and thus cycle-life characteristics may be improved due to the doped divalent element of $M^1$ and tetravalent element of $M^2$.

In Chemical Formula 1, $M^1$ may be Mg, Ba, or a combination thereof, $M^2$ is Ti, Zr, Mn, Si, or a combination thereof, or $M^1$ may be Mg and $M^2$ may be Ti.

In Chemical Formula 1, when the doping element $M^1$ is a divalent element, $Ni^{4+}$ or $Co^{4+}$ may be formed to stabilize a structure. In Chemical Formula 1, when the value of k, representing the relative amount of $M^1$, is less than 0.001, structure stabilization effect may be negligible. On the other hand, when the value of k is greater than 0.6, capacity may be deteriorated.

In Chemical Formula 1, when the doping element $M^2$ is a tetravalent element, a c-axis spacing may increase in a X-ray diffraction measurement. Thus, lithium mobility may be improved and capacity may increase due to generation of $Ni^{2+}$. In Chemical Formula 1, when the value of p, representing the relative amount of $M^2$, is less than 0.001, lithium mobility improvement may be negligible. On the other hand, when the value of p is greater than 0.005, crystallinity may be deteriorated.

In Chemical Formula 1, the k and the p may have a relationship of $0.002 \leq k+p \leq 0.01$. The ratio of k to p may have be about 2:8 to about 8:2 According to an embodiment, of the ratio of k to p may be in a range of 3.33:6.67 to 7.5:2.5.

A c-axis spacing in a crystal structure of the positive active material may be about 14.168 Å to about 14.174 Å. When the c-axis spacing is within the range, channels through which lithium ions are transferred become wider, ion conductivity may be improved.

A full width at half maximum, $FWHM_{(003)}$ of a diffraction peak at a (003) plane, as determined by X-ray diffraction measurement of the positive active material, may be about 0.13 to about 0.16. When $FWHM_{(003)}$ is within the range, crystallinity becomes improved, and thus a structure is stabilized to improve cycle-life characteristics.

The c-axis spacing and FWHM may be measured using a X-ray diffraction measurement apparatus that uses a CuKα ray.

The positive active material according to an embodiment may be prepared by a general preparation process of a positive active material in this art, which is described briefly.

A lithium-containing compound, a nickel-containing compound, a cobalt-containing compound, an Me-containing compound, an $M^1$-containing compound, and a $M^2$-containing compound may be mixed to prepare a mixture.

The lithium-containing compound may be a lithium acetate, a lithium nitrate, a lithium hydroxide, a lithium carbonate, a lithium acetate, a hydrate thereof, or a combination thereof. The nickel-containing compound may be a nickel nitrate, a nickel hydroxide, a nickel carbonate, a nickel acetate, a nickel sulfate, a hydrate thereof, or a combination thereof. The cobalt-containing compound may be a cobalt nitrate, a cobalt hydroxide, a cobalt carbonate, a cobalt acetate, a cobalt sulfate, a hydrate thereof, or a combination thereof and the Me-containing compound may be an Me-containing nitrate, an Me-containing hydroxide, an Me-containing carbonate, an Me-containing acetate, an Me-containing sulfate, a hydrate thereof, or a combination thereof. The $M^1$-containing compound may be an $M^1$-containing nitrate, an $M^1$-containing hydroxide, an $M^1$-containing carbonate, an $M^1$-containing acetate, an $M^1$-containing sulfate, an $M^1$-containing oxide, a hydrate thereof or a combination thereof, and the $M^2$-containing compound may be an $M^2$-containing nitrate, an $M^2$-containing hydroxide, an $M^2$-containing carbonate, an $M^2$-containing acetate, an $M^2$-containing sulfate, an $M^2$-containing oxide, a hydrate thereof, or a combination thereof.

A mixing ratio of the lithium-containing compound, the nickel-containing compound, the cobalt-containing compound, the Me-containing compound, the $M^1$-containing compound, and the $M^2$-containing compound may appropriately be controlled such that the compound of Chemical Formula 1 may be obtained.

The mixture may be heat-treated to prepare a positive active material. The heat-treating process may be performed at about 700° C. to about 1,000° C., for about 3 hours to about 20 hours. The heat-treating process may be performed under an oxygen $O_2$ atmosphere, or an air atmosphere.

Another embodiment provides a rechargeable lithium battery including the positive electrode including a positive active material, a negative electrode including a negative active material, and an electrolyte.

The positive electrode includes a positive active material layer and a current collector supporting the positive active material. In the positive active material layer, a content of the positive active material may be about 90 wt % to about 98 wt % based on the total amount of the positive active material layer.

In an embodiment, the positive active material layer may further include a binder and a conductive material. The binder and conductive material may be included in an amount of about 1 wt % to about 5 wt %, respectively, based on the total amount of the positive active material layer.

The binder may improve binding properties of positive active material particles with one another and with a current collector. Examples of the hinder may be polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity. Any electrically conductive material that does not cause chemical change may be used as a conductive material. Specific examples of the conductive material include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or a mixture thereof.

The current collector may be Al, as an example.

The negative electrode may include a current collector and a negative active material layer formed on the current collector. The negative active material layer may include a negative active material.

The negative active material may include a material that reversibly intercalates/deintercalates lithium ions, a lithium metal, a lithium metal alloy, a material being capable of doping/dedoping lithium, or a transition metal oxide.

The material that can reversibly intercalate/deintercalate lithium ions may include a carbon material. The carbon material may be any generally-used carbon-based negative active material in a lithium ion rechargeable battery. Examples of the carbon material may include crystalline carbon, amorphous carbon, or mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, or the like.

Examples of the lithium metal alloy may include lithium and an element selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and is not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and is not Sn), or the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al Ga, Sn, In, Tl, Ge, P, As, Sb, Bi, S, Se, Te, Po, or a combination thereof.

The transition metal oxide may include vanadium oxide, lithium vanadium oxide, or the like.

In the negative active material layer, the negative active material may be included in an amount of about 95 wt % to about 99 wt % based on the total weight of the negative active material layer.

In an embodiment, the negative active material layer may include a binder, and optionally, a conductive material. The negative active material layer may include about 1 to about 5 wt % of a binder based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder may improve binding properties of negative active material particles with one another and with a current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from an ethylenepropylene copolymer, polyepichlorohydrine, polyphosphazene, polyacrylonitrile, polystyrene, an ethylenepropylenediene copolymer, polyvinylpyridine, chlorosulfonatedpolyethylene, a latex, a polyester resin, an acrylic resin, phenolic resin, an epoxy resin, polyvinyl alcohol, and a combination thereof.

When the water-soluble binder is used as a negative electrode binder, a cellulose-based compound may be further used to provide viscosity as an agent for increasing viscosity. The cellulose-based compound may include one or more of carboxymethyl cellulose, hydroxypropylmethyl cellulose, methyl cellulose, or alkali metal salts thereof. The alkali metal may be Na, K, or Li. The agent for increasing viscosity may be included in an amount of about 0.1 parts by weight to about 3 parts by weight based on 100 parts by weight of the negative active material.

The conductive material may be included to provide electrode conductivity.

Any electrically conductive material that does not cause chemical change may be used as a conductive material. Examples of the conductive material include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof, as examples.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, or the like. The ether-based solvent includes dibutyl ether, tetraglyme, diglyme, dimethoxyethane, 2-methyltetrahydrofuran, tetrahydrofuran, or the like. The ketone-based solvent includes cyclohexanone or the like. The alcohol-based solvent include ethyl alcohol, isopropyl alcohol, or the like. Examples of the aprotic solvent include nitriles such as R—CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, or the like.

The organic solvent may be used singularly or in a mixture. When the organic solvent is used in a mixture, the mixture ratio may be controlled in accordance with a desirable battery performance.

The carbonate-based solvent may include a mixture of a cyclic carbonate and a linear carbonate. The cyclic carbonate and linear carbonate may be mixed together in a volume ratio of about 1:1 to about 1:9. When the mixture is used as an electrolyte, the electrolyte may have enhanced performance.

The organic solvent may further include an aromatic hydrocarbon-based solvent as well as the carbonate-based solvent. The carbonate-based solvent and aromatic hydrocarbon-based solvent may be mixed together in a volume ratio of about 1:1 to about 30:1.

The aromatic hydrocarbon-based organic solvent may be an aromatic hydrocarbon-based compound represented by Chemical Formula 2.

[Chemical Formula 2]

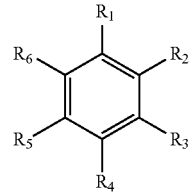

In Chemical Formula 2, $R_1$ to $R_6$ may be the same or different and may be selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate, an ethylene carbonate-based compound represented by Chemical Formula 3, or propanesultone to improve cycle life, as additive for improving the cycle-life.

[Chemical Formula 3]

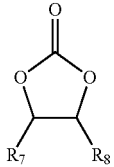

In Chemical Formula 3, $R_7$ and $R_8$ are the same or different and may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, vinylethylene carbonate, fluoroethylene carbonate, or the like. The amount of the additive for improving cycle life may be flexibly used within an appropriate range.

The lithium salt dissolved in an organic solvent supplies a battery with lithium ions, basically operates the rechargeable lithium battery, and improves transportation of the lithium ions between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers. e.g. an integer of 1 to 20), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on the kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 illustrates exploded partial perspective view of a rechargeable lithium battery according to an embodiment. The rechargeable lithium battery may be one of variously-shaped batteries such as a cylindrical battery, a pouch battery, or the like. For example, as shown in FIG. 1, the rechargeable lithium battery may be a prismatic rechargeable lithium battery.

Referring to FIG. 1, a rechargeable lithium battery 100 according to an embodiment may include an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30. The case 50 may be sealed, for example, by a cover or cap, or other form of sealing member depending on the type of rechargeable lithium battery. Electrode tabs or terminals electrically connected to the positive electrode 10 and the negative electrode 20, respectively, may be outside the case.

The following Experimental Examples, Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Experimental Example 1

Lithium carbonate, nickel sulfate, cobalt sulfate, and aluminum sulfate were mixed to have a mole ratio of Li:Ni:Co:Mn=1:0.5:0.2:0.3.

The mixture was heat-treated at 740° C. under an oxygen ($O_2$) atmosphere for 20 hours to prepare a $LiNi_{0.5}Co_{0.2}Mn_{0.3}O_2$ positive active material.

94 wt % of the prepared positive active material, 3 wt % of a polyvinylidene fluoride binder, and 3 wt % of a ketjen black conductive material were dissolved in an N-methylpyrrolidone solvent to prepare a positive active material composition. The positive active material composition was coated onto an Al current collector to manufacture a positive electrode.

Experimental Example 2

A $LiNi_{0.6}Co_{0.2}Mn_{0.2}O_2$ positive active material was prepared according to the same method as Experimental Example 1 except for mixing lithium carbonate, nickel sulfate, cobalt sulfate, and aluminum sulfate were mixed to have a mole ratio of Li:Ni:Co:Mn=1:0.6:0.2:0.2. The positive active material was used to manufacture a positive electrode according to the same method as Experimental Example 1.

Experimental Example 3

A $LiNi_{0.7}Co_{0.15}Mn_{0.15}O_2$ positive active material was prepared according to the same method as Experimental Example 1 except for mixing lithium hydroxide, nickel sulfate, cobalt sulfate, and aluminum sulfate to have a mole ratio of Li:Ni:Co:Mn=1:0.7:0.15:0.15. The positive active material was used to manufacture a positive electrode according to the same method as Experimental Example 1.

Experimental Example 4

A $LiNi_{0.8}Co_{0.15}Al_{0.05}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.8:0.15:0.05. The positive active material was used to manufacture a positive electrode according to the same method as Experimental Example 1.

Experimental Example 5

A $LiNi_{0.82}Co_{0.15}Al_{0.03}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.82:0.15:0.03. The positive active material was used to manufacture a positive electrode according to the same method as Experimental Example 1.

Experimental Example 6

A $LiNi_{0.85}Co_{0.135}Al_{0.015}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.85:0.135:0.015. The positive active material was used to manufacture a positive electrode according to the same method as Experimental Example 1.

Experimental Example 7

A $LiNi_{0.9}Co_{0.09}Al_{0.01}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.9:0.09:0.01. The positive active material was used to manufacture a positive electrode according to the same method as Experimental Example 1.

Experimental Example 8

A $LiNi_{0.92}Co_{0.07}Al_{0.01}O_2$ positive active material was prepared according to the same method as Experimental Example 1 except for mixing lithium hydroxide, nickel sulfate, cobalt sulfate, and aluminum sulfate to have a mole ratio of Li:Ni:Co:Al=1:0.92:0.07:0.01. The positive active material was used to manufacture a positive electrode according to the same method as Experimental Example 1.

Each positive electrode according to Experimental Examples 1 to 8, a lithium metal counter electrode, and an electrolyte were used to manufacture a coin-type half-cell in a common method. The electrolyte was prepared by dissolving 1.0 M $LiPF_6$ in a mixed solvent of ethylene carbonate and diethyl carbonate (50:50 volume ratio).

Figure 2:
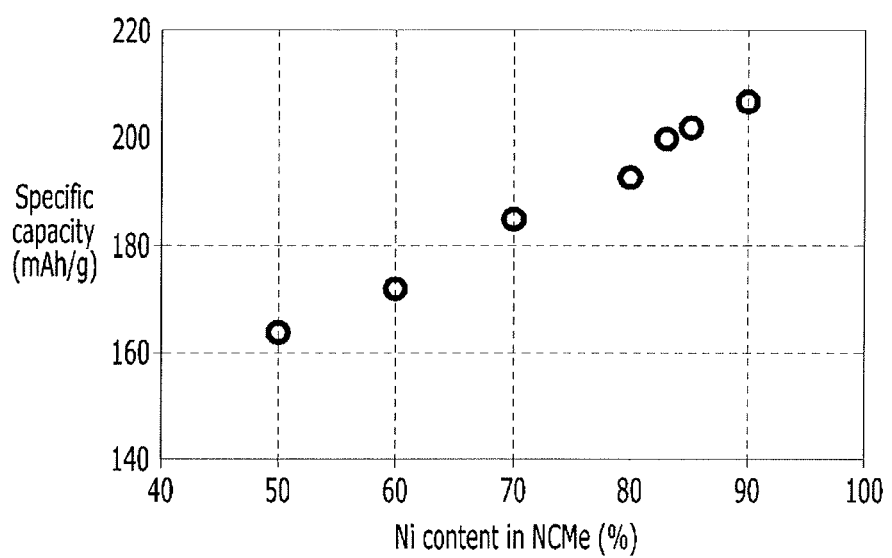
FIG. 2 illustrates a graph showing discharge capacity results of half cells using the positive electrodes according to Experimental Examples 1 to 8.

The half-cell was charged and discharged at 25° C. within a range of 3.0 V to 4.3 V at 0.2 C, and its discharge capacity was measured The results are provided in FIG. 2.

As shown in FIG. 2, as the nickel content increased, the capacity of the half-cell increased. For example, when x in a $Li_aNi_xCo_yMn_zO_2$ compound was greater than or equal to 0.7 (greater than or equal to 70% in FIG. 2), a capacity greater than or equal to 180 mAh/g was obtained.

Example 1

Lithium hydroxide, nickel sulfate, cobalt sulfate, aluminum sulfate, $MgCO_3$, and $TiO_2$ were mixed to have a mole ratio of Li:Ni:Co:Al:Mg:Ti=1:0.848:0.135:0.015:0.001:0.001.

The mixture was heat-treated at 740° C. under an oxygen ($O_2$) atmosphere for 20 hours to prepare a $LiNi_{0.848}Co_{0.135}Al_{0.015}Mg_{0.001}Ti_{0.001}O_2$ positive active material. 94 wt % of the prepared positive active material, 3 wt % of a polyvinylidene fluoride binder, and 3 wt % of a ketjen black conductive material were dissolved in an N-methylpyrrolidone solvent to prepare a positive active material composition. The positive active material composition was coated onto an Al current collector to manufacture a positive electrode.

Example 2

A $LiNi_{0.846}Co_{0.135}Al_{0.015}Mg_{0.002}Ti_{0.002}O_2$ positive active material was prepared according to the same method as Example 1 except for mixing lithium hydroxide, nickel sulfate, cobalt sulfate, aluminum sulfate, $MgCO_3$, and $TiO_2$ to have a mole ratio of Li:Ni:Co:Al:Mg:Ti=1:0.846:0.135:0.015:0.002:0.002. A positive electrode was manufactured using the positive active material according to the same method as in Example 1.

Example 3

A $LiNi_{0.844}Co_{0.135}Al_{0.015}Mg_{0.002}Ti_{0.004}O_2$ positive active material was prepared according to the same method as Example 1 except for mixing lithium hydroxide, nickel sulfate, cobalt sulfate, aluminum sulfate, $MgCO_3$, and $TiO_2$ to have a mole ratio of Li:Ni:Co:Al:Mg:Ti=1:0.844:0.135:0.015:0.002:0.004. A positive electrode was manufactured using the positive active material according to the same method as in Example 1.

Example 4

A $LiNi_{0.844}Co_{0.135}Al_{0.015}Mg_{0.004}Ti_{0.002}O_2$ positive active material was prepared according to the same method as Example 1 except for mixing lithium hydroxide, nickel sulfate, cobalt sulfate, aluminum sulfate, $MgCO_3$, and $TiO_2$ to have a mole ratio of Li:Ni:Co:Al:Mg:Ti=1:0.844:0.135:0.015:0.004:0.002. A positive electrode was manufactured using the positive active material according to the same method as in Example 1.

Example 5

A $LiNi_{0.842}Co_{0.135}Al_{0.015}Mg_{0.006}Ti_{0.002}O_2$ positive active material was prepared according to the same method as Example 1 except for mixing lithium hydroxide, nickel sulfate, cobalt sulfate, aluminum sulfate, $MgCO_3$, and $TiO_2$ to have a mole ratio of Li:Ni:Co:Al:Mg:Ti=1:0.842:0.135:0.015:0.006:0.002. A positive electrode was manufactured using the positive active material according to the same method as in Example 1.

Example 6

A $LiNi_{0.84}Co_{0.135}Al_{0.015}Mg_{0.005}Ti_{0.005}O_2$ positive active material was prepared according to the same method as Example 1 except for mixing lithium hydroxide, nickel sulfate, cobalt sulfate, aluminum sulfate, MgCO$_3$, and TiO$_2$ to have a mole ratio of Li:Ni:Co:Al:Mg:Ti=1:0.84:0.135: 0.015:0.005:0.005. A positive electrode was manufactured using the positive active material according to the same method as in Example 1.

Comparative Example 1

A LiNi$_{0.849}$Co$_{0.135}$Al$_{0.015}$Mg$_{0.0005}$Ti$_{0.0005}$O$_2$ positive active material was prepared according to the same method as Example 1 except for mixing lithium hydroxide, nickel sulfate, cobalt sulfate, aluminum sulfate, MgCO$_3$, and TiO$_2$ to have a mole ratio of Li:Ni:Co:Al:Mg:Ti=1:0.849:0.135: 0.015:0.0005:0.0005. A positive electrode was manufactured using the positive active material according to the same method as in Example 1.

Comparative Example 2

A LiNi$_{0.842}$Co$_{0.135}$Al$_{0.015}$Mg$_{0.002}$Ti$_{0.006}$O$_2$ positive active material was prepared according to the same method as Example 1 except for mixing lithium hydroxide, nickel sulfate, cobalt sulfate, aluminum sulfate, MgCO$_3$, and TiO$_2$ to have a mole ratio of Li:Ni:Co:Al:Mg:Ti=1:0.842:0.135: 0.015:0.002:0.006. A positive electrode was manufactured using the positive active material according to the same method as in Example 1.

Comparative Example 3

A LiNi$_{0.184}$Co$_{0.135}$Al$_{0.015}$Mg$_{0.002}$Ti$_{0.008}$O$_2$ positive active material was prepared according to the same method as Example 1 except for mixing lithium hydroxide, nickel sulfate, cobalt sulfate, aluminum sulfate, MgCO$_3$, and TiO$_2$ to have a mole ratio of Li:Ni:Co:Al:Mg:Ti=1:0.84:0.135: 0.015:0.002:0.008. A positive electrode was manufactured using the positive active material according to the same method as in Example 1.

Comparative Example 4

A LiNi$_{0.84}$Co$_{0.135}$Al$_{0.015}$Mg$_{0.008}$Ti$_{0.002}$O$_2$ positive active material was prepared according to the same method as Example 1 except for mixing lithium hydroxide, nickel sulfate, cobalt sulfate, aluminum sulfate, MgCO$_3$, and TiO$_2$ to have a mole ratio of Li:Ni:Co:Al:Mg:Ti=1:0.84:0.135: 0.015:0.008:0.002. A positive electrode was manufactured using the positive active material according to the same method as in Example 1.

Comparative Example 5

A LiNi$_{0.83}$Co$_{0.135}$Al$_{0.015}$Mg$_{0.01}$Ti$_{0.01}$O$_2$ positive active material was prepared according to the same method as Example 1 except for mixing lithium hydroxide, nickel sulfate, cobalt sulfate, aluminum sulfate, MgCO$_3$, and TiO$_2$ to have a mole ratio of Li:Ni:Co:Al:Mg:Ti=1:0.83:0.135: 0.015:0.01:0.01. A positive electrode was manufactured using the positive active material according to the same method as in Example 1.

Comparative Example 6

Lithium hydroxide, nickel sulfate, cobalt sulfate, and aluminum sulfate were mixed to have a mole ratio of Li:Ni:Co:Al=1:0.85:0.135:0.015.

The mixture was heat-treated at 740° C. under an oxygen (O$_2$) atmosphere for 20 hours to prepare a LiNi$_{0.85}$Co$_{0.135}$Al$_{0.015}$O$_2$ positive active material.

Comparative Example 7

Lithium hydroxide, nickel sulfate, cobalt sulfate, aluminum sulfate, and MgCO$_3$ were mixed to have a mole ratio of Li:Ni:Co:Al:Mg=1:0.848:0.135:0.015:0.002.

The mixture was heat-treated at 740° C. under an oxygen (O$_2$) atmosphere for 20 hours to prepare a LiNi$_{0.848}$Co$_{0.135}$Al$_{0.015}$Mg$_{0.002}$O$_2$ positive active material.

Comparative Example 8

Lithium hydroxide, nickel sulfate, cobalt sulfate, aluminum sulfate, and TiO$_2$ were mixed to have a mole ratio of Li:Ni:Co:Al:Ti=1:0.848:0.135:0.015:0.002.

The mixture was heat-treated at 740° C. under an oxygen (O$_2$) atmosphere for 20 hours to prepare a LiNi$_{0.848}$Co$_{0.135}$Al$_{0.015}$Ti$_{0.002}$O$_2$ positive active material.

Comparative Example 9

Lithium hydroxide, nickel sulfate, cobalt sulfate, aluminum sulfate, and Mn$_3$O$_4$ were mixed to have a mole ratio of Li:Ni:Co:Al:Mn=1:0.848:0.135:0.015:0.002.

The mixture was heat-treated at 740° C. under an oxygen (O$_2$) atmosphere for 20 hours to prepare a LiNi$_{0.848}$Co$_{0.135}$Al$_{0.015}$Mn$_{0.002}$O$_2$ positive active material.

Figure 3:
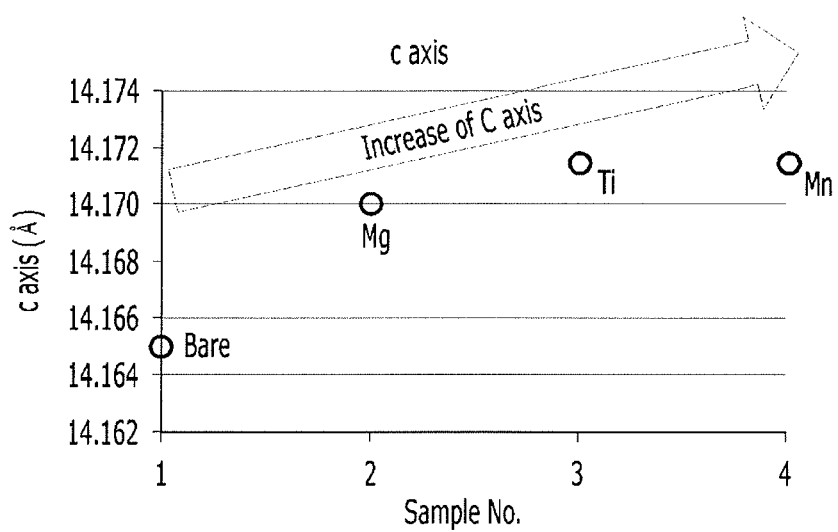
FIG. 3 illustrates a graph showing changes of c-axis spacing in X-ray diffraction measurement depending on kinds of a divalent element and a tetravalent element.
Figure 4:
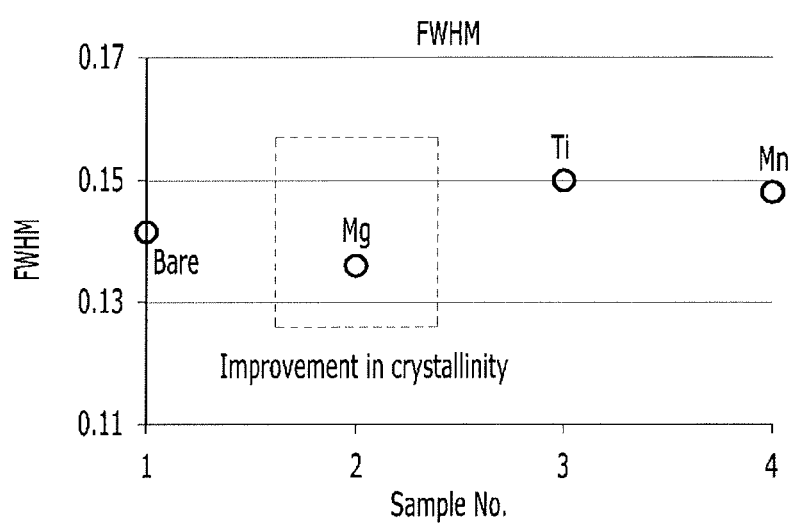
FIG. 4 illustrates a graph showing FWHM changes depending on kinds of a divalent element and a tetravalent element.

A c-axis spacing and a full width at half maximum of a diffraction peak at a (003) plane (FWHM$_{(003)}$) of the positive active materials according to Comparative Examples 6 to 9 were measured by using a CuKα ray, and the results are shown in FIGS. 3 and 4. In FIGS. 3 and 4, Comparative Example 6 is indicated by "bare". Comparative Examples 7 to 9 are indicated by Mg, Ti, and Mn, respectively. As shown in FIG. 3, the positive active materials having a doping element according to Comparative Examples 7 to 9 exhibited a c-axis spacing increase compared with the positive active material having no doping element according to Comparative Example 6. In particular, the positive active materials doped with a tetravalent element such as Ti and Mn according to Comparative Examples 8 and 9 exhibited a c-axis spacing increase compared with the positive active material having no doping element according to Comparative Example 6.

In addition, as shown in FIG. 4, the positive active material doped with a divalent element according to Comparative Example 7, indicated by Mg, exhibited a FWHM$_{(003)}$ decrease, and thus, may be considered to have crystalline improvement compared with the positive active material having no doping element according to Comparative Example 6. The positive active materials doped with a tetravalent element of Ti or Mn according to Comparative Examples 8 and 9 exhibited a FWHM$_{(003)}$ increase and thus may be considered to have crystalline deterioration compared with the positive active material having no doping element according to Comparative Example 6.

Figure 5:
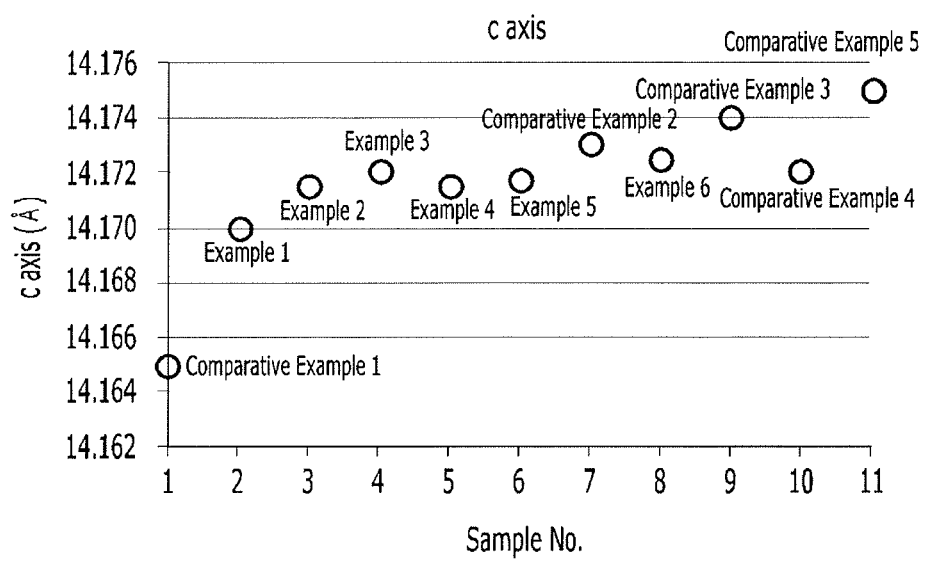
FIG. 5 illustrates a graph showing c-axis spacing of the positive active materials according to Examples 1 to 6 and Comparative Examples 1 to 5 in X-ray diffraction measurement.
Figure 6:
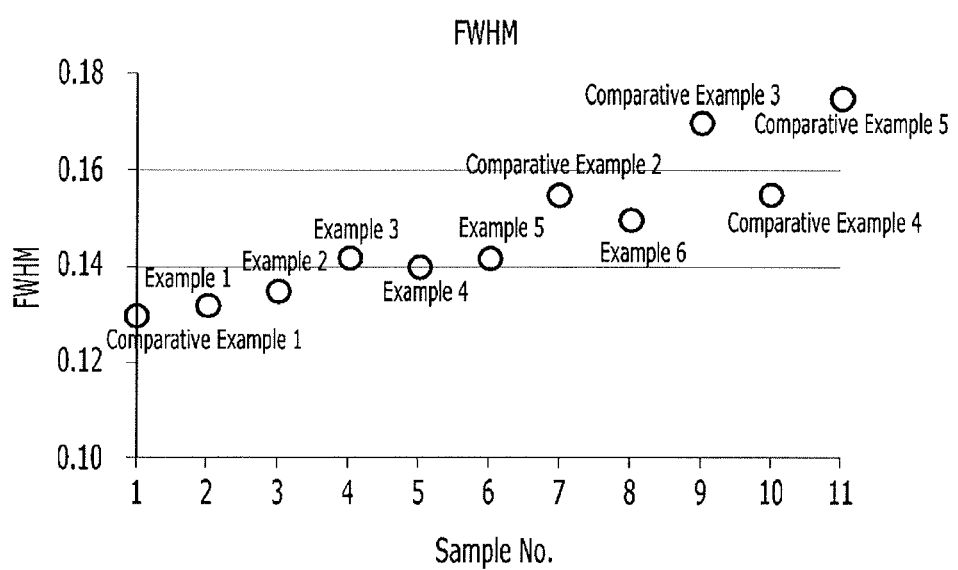
FIG. 6 illustrates a graph showing FWHM's of the positive active materials according to Examples 1 to 6 and Comparative Examples 1 to 5.

A c-axis spacing and a full width at half maximum of a diffraction peak at a (003) plane (FWHM$_{(003)}$) of the positive active materials according to Examples 1 to 6 and Comparative Examples 1 to 5 were measured by using a CuKα ray, and the results are respectively shown in FIGS. 5 and 6. In addition, the c-axis spacing and the FWHM$_{(003)}$ are shown in Table 1.

TABLE 1

|  | c (Å) | FWHM$_{(003)}$ |
|---|---|---|
| Comparative Example 1 | 14.1650 | 0.130 |
| Example 1 | 14.1700 | 0.132 |
| Example 2 | 14.1715 | 0.135 |
| Example 3 | 14.1720 | 0.142 |
| Example 4 | 14.1715 | 0.140 |
| Example 5 | 14.1717 | 0.142 |
| Comparative Example 2 | 14.1730 | 0.155 |
| Example 6 | 14.1725 | 0.150 |
| Comparative Example 3 | 14.1740 | 0.170 |
| Comparative Example 4 | 14.1720 | 0.155 |
| Comparative Example 5 | 14.1750 | 0.175 |

As shown in FIG. 5 and Table 1, as a doping element of Ti is used in a higher mole ratio, the c-axis spacing is increased. In particular, the positive active materials including Mg in a mole ratio of 0.001 to 0.006 and Ti in a mole ratio of 0.001 to 0.005 according to Examples 1 to 6 exhibited a c-axis spacing within a range of 14.168 Å to 14.174 Å.

In addition, as shown in FIG. 6 and the Table 1, when Mg was used in a mole ratio of less than 0.001, FWHM$_{(003)}$ was decreased into less than 0.13, that is, crystallinity was increased, and a structure became instable. For example, the positive active materials using Mg in a mole ratio of 0.001 to 0.006 and Ti in a mole ratio of 0.001 to 0.005 according to Examples 1 to 6 exhibited FWHM$_{(003)}$ in a range of 0.13 to 0.16.

The positive electrodes according to Examples 1 to 6 and the Comparative Examples 1 to 5, a lithium metal counter electrode, and an electrolyte were respectively used to manufacture each coin-type half-cell using a general method. The electrolyte was prepared by dissolving 1.3 M LiPF$_6$ in a mixed solvent of ethylene carbonate and diethyl carbonate (50:50 volume ratio).

The manufactured half-cells were charged and discharged at 25° C. 50 times within a range of 3.0 V to 4.3 V at 0.2 C, and their discharge capacities were measured. In addition, a capacity retention was obtained by calculating a ratio of the 50th discharge capacity relative to the first discharge capacity.

Figure 7:
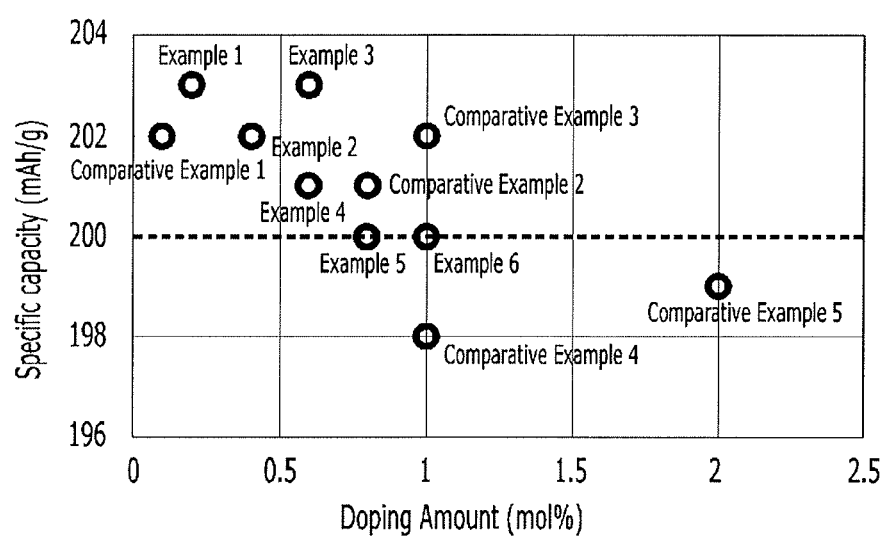
FIG. 7 illustrates a graph showing discharge capacity results of half cells using the positive electrodes according to Examples 1 to 6 and Comparative Examples 1 to 5.
Figure 8:
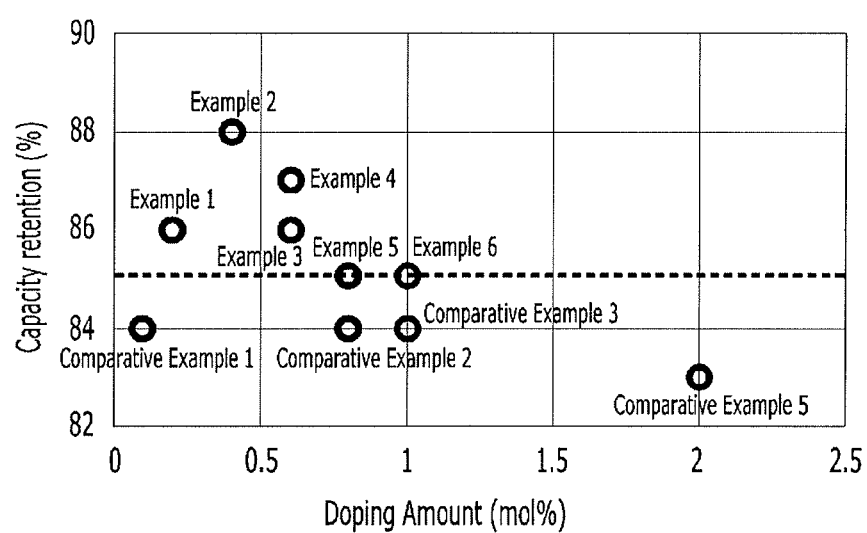
FIG. 8 illustrates a graph showing room temperature cycle-life characteristic results of half cells using the positive electrodes according to Examples 1 to 6 and Comparative Examples 1 to 5.

FIG. 7 shows the discharge capacity results of Examples 1 to 6 and Comparative Examples 1 to 5, and FIG. 8 shows the capacity retention results of Examples 1 to 6 and Comparative Examples 1 to 3 and 5. In addition, the discharge capacity and capacity retention results are shown in Table 2.

In Table 2, an Mg mole ratio is k in Chemical Formula 1, a Ti mole ratio is p, and an entire Mg+Ti mole ratio is k+p.

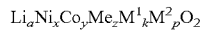

$Li_aNi_xCo_yMe_zM^1_kM^2_pO_2$     [Chemical Formula 1]

TABLE 2

|  | entire Mg + Ti mole ratio | Mg mole ratio | Ti mole ratio | discharge capacity (mAh/g) | Room temperature cycle-life (%) |
|---|---|---|---|---|---|
| Comparative Example 1 | 0.001 | 0.0005 | 0.0005 | 202 | 84 |
| Example 1 | 0.002 | 0.001 | 0.001 | 203 | 86 |
| Example 2 | 0.004 | 0.002 | 0.002 | 202 | 88 |
| Example 3 | 0.006 | 0.002 | 0.004 | 203 | 86 |
| Example 4 | 0.006 | 0.004 | 0.002 | 201 | 87 |
| Example 5 | 0.008 | 0.006 | 0.002 | 200 | 85 |
| Comparative Example 2 | 0.008 | 0.002 | 0.006 | 201 | 84 |
| Example 6 | 0.01 | 0.005 | 0.005 | 200 | 85 |
| Comparative Example 3 | 0.01 | 0.002 | 0.008 | 202 | 84 |
| Comparative Example 4 | 0.01 | 0.008 | 0.002 | 198 | 85 |
| Comparative Example 5 | 0.02 | 0.01 | 0.01 | 199 | 83 |

As shown in Table 2 and FIG. 7, the half-cells using the positive active materials having an Mg mole ratio in a range of 0.001 to 0.006 and a Ti mole ratio in a range of 0.001 to 0.005 according to Examples 1 to 6, the positive active material having an Mg mole ratio of 0.0005 and a Ti mole ratio of 0.0005 according to Comparative Example 1, the positive active material having an Mg mole ratio of 0.002 and a Ti mole ratio of 0.006 according to Comparative Example 2, and the positive active material having an Mg mole ratio of 0.002 and a Ti mole ratio of 0.008 according to Comparative Example 3 exhibited excellent discharge capacity compared with the half-cells according to Comparative Examples 4 and 5 using positive active materials having Mg and Ti mole ratios beyond these ranges.

In addition, as shown in Table 2 and FIG. 8, the half cells using the positive active material having a Mg mole ratio of 0.001 to 0.006 and a Ti mole ratio of 0.001 to 0.005 according to Examples 1 to 6 exhibited an excellent capacity retention compared with the half-cells using the positive active materials according to Comparative Examples 1 to 3 and 5 having Mg and Ti mole ratios beyond these ranges This capacity retention improvement is a surprising result thought to be rarely obtained by a battery using a positive active material having a high Ni content.

As shown in Table 2 and FIGS. 7 and 8, the half-cells using the positive active materials having a Mg mole ratio of 0.001 to 0.006 and a Ti mole ratio of 0.001 to 0.005 according to Examples 1 to 6 exhibited discharge capacity of greater than or equal to 200 mAh/g and a capacity retention of greater than or equal to 85%. Thus, rechargeable lithium batteries including such positive active materials may be usefully used as a power source for a medium and large sized hybrid vehicle or electric vehicle and the like. On the other hand, the half cells using the positive active materials beyond the range according to Comparative Examples 1 to 5 exhibited a discharge capacity of less than 200 mAh/g or a discharge capacity retention of less than of 85% and thus, these positive active materials may not be appropriate for use as a power source for a medium and large sized hybrid vehicle or electric vehicle requiring a long cycle-life.

Example 7

Lithium hydroxide, nickel sulfate, cobalt sulfate, manganese sulfate, MgCO$_3$, and TiO$_2$ were mixed to have a mole ratio of Li:Ni:Co:Mn:Mg:Ti=1:0.848:0.135:0.015:0.001:0.001.

The mixture was heat-treated at 740° C. under an oxygen (O$_2$) atmosphere for 20 hours to prepare a LiNi$_{0.848}$Co$_{0.135}$Mn$_{0.001}$Mg$_{0.001}$Ti$_{0.001}$O$_2$ positive active material. 94 wt % of the prepared positive active material, 3 wt % of a polyvinylidene fluoride binder, and 3 wt % of a ketjen black conductive material were dissolved in an N-methylpyrrolidone solvent to prepare a positive active material composition. The positive active material composition was coated on an Al current collector to manufacture a positive electrode.

Example 8

A $LiNi_{0.846}Co_{0.135}Mn_{0.015}Mg_{0.002}Ti_{0.002}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.846:0.135: 0.015:0.002:0.002. A positive electrode was manufactured using the positive active material according to the same method as in Example 1.

Example 9

A $LiNi_{0.844}Co_{0.135}Mn_{0.015}Mg_{0.002}Ti_{0.004}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.844:0.135: 0.015:0.002:0.004. A positive electrode was manufactured using the positive active material according to the same method as in Example 1.

Example 10

A $LiNi_{0.844}Co_{0.135}Mn_{0.015}Mg_{0.004}Ti_{0.002}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.844:0.135: 0.015:0.004:0.002. A positive electrode was manufactured using the positive active material according to the same method as in Example 1.

Example 11

A $LiNi_{0.842}Co_{0.135}Mn_{0.015}Mg_{0.006}Ti_{0.002}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.842:0.135: 0.015:0.006:0.002. A positive electrode was manufactured using the positive active material according to the same method as in Example 1.

Example 12

A $LiNi_{0.84}Co_{0.135}Mn_{0.015}Mg_{0.005}Ti_{0.005}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.84:0.135: 0.015:0.005:0.005. A positive electrode was manufactured using the positive active material according to the same method as in Example 1.

Comparative Example 10

A $LiNi_{0.849}Co_{0.135}Mn_{0.015}Mg_{0.0005}Ti_{0.0005}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.849:0.135: 0.015:0.0005:0.0005. A positive electrode was manufactured using the positive active material according to the same method as in Example 7.

Comparative Example 11

A $LiNi_{0.842}Co_{0.135}Mn_{0.015}Mg_{0.002}Ti_{0.006}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.842:0.135: 0.015:0.002:0.006. A positive electrode was manufactured using the positive active material according to the same method as in Example 7.

Comparative Example 12

A $LiNi_{0.84}Co_{0.135}Mn_{0.015}Mg_{0.002}Ti_{0.008}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.84:0.135: 0.015:0.002:0.008. A positive electrode was manufactured using the positive active material according to the same method as in Example 7.

Comparative Example 13

A $LiNi_{0.84}Co_{0.135}Mn_{0.015}Mg_{0.008}Ti_{0.002}O_2$ positive active material was prepared according to the same method as Example 1 except for mixing lithium hydroxide, nickel sulfate, cobalt sulfate, aluminum sulfate, $MgCO_3$, and $TiO_2$ to have a mole ratio of Li:Ni:Co:Mn:Mg:Ti=1:0.84:0.135: 0.015:0.008:0.002. A positive electrode was manufactured using the positive active material according to the same method as in Example 7.

Comparative Example 14

A $LiNi_{0.83}Co_{0.135}Mn_{0.015}Mg_{0.01}Ti_{0.01}O_2$ positive active material was prepared according to the same method as Example 1 except for mixing lithium hydroxide, nickel sulfate, cobalt sulfate, manganese sulfate, $MgCO_3$, and $TiO_2$ to have a mole ratio of Li:Ni:Co:Mn:Mg:Ti=1:0.83:0.135: 0.015:0.01:0.01. A positive electrode was manufactured using the positive active material according to the same method as in Example 7.

A c-axis spacing and a full width at half maximum diffraction peak at a (003) plane ($FWHM_{(003)}$) of the positive active materials according to Examples 7 to 12 and Comparative Examples 10 to 14 were measured by using a CuKα-ray, and the results are shown in Table 3.

TABLE 3

| | c (Å) | $FWHM_{(003)}$ |
|---|---|---|
| Comparative Example 10 | 14.1660 | 0.135 |
| Example 7 | 14.1710 | 0.137 |
| Example 8 | 14.1725 | 0.140 |
| Example 9 | 14.1720 | 0.147 |
| Example 10 | 14.1725 | 0.145 |
| Example 11 | 14.1727 | 0.147 |
| Comparative Example 11 | 14.1735 | 0.160 |
| Example 12 | 14.1735 | 0.155 |
| Comparative Example 12 | 14.1750 | 0.175 |
| Comparative Example 13 | 14.1730 | 0.160 |
| Comparative Example 14 | 14.1760 | 0.180 |

As shown in Table 3, as Ti is used as a doping element in a higher mole ratio, the c-axis spacing is increased. For example, the positive active materials having an Mg mole ratio of 0.001 to 0.006 and a Ti mole ratio of 0.001 to 0.005 according to Examples 7 to 12 had a c-axis spacing in a range of 14.168 Å to 14.174 Å.

In addition, as shown in Table 3, when the Mg mole ratio is less than 0.001, $FWHM_{(003)}$ was shown to be less than 0.13, indicating that crystallinity is increased, such that the structure could become instable. For example, the positive active materials having a Mg mole ratio in a range of 0.001 to 0.006 and a Ti mole ratio in a range of 0.001 to 0.005 according to Examples 7 to 12 exhibited $FWHM_{(003)}$ values in a range of 0.13 to 0.16.

Each positive electrode according to Examples 7 to 12 and Comparative Examples 10 to 14, a lithium metal counter electrode, and an electrolyte were used to manufacture a coin-type half-cell in a common method. The electrolyte was used by dissolving 1.3 M $LiPF_6$ in a mixed solvent of ethylene carbonate and diethyl carbonate (50:50 volume ratio).

The half-cells were charged and discharged 50 times at 25° C. in a range of 3.0 V to 4.3 V at 0.2 C, and their discharge capacities were measured. In addition, a capacity retention was obtained by calculating a ratio of the 50th discharge capacity relative to the first discharge capacity.

The obtained discharge capacity and capacity retention results are shown in Table 4.

In Table 4, an Mg mole ratio is k, a Ti mole ratio is p, and an entire Mg+Ti mole ratio is k+p in Chemical Formula 1.

$Li_aNi_xCo_yMe_zM^1_kM^2_pO_2$      [Chemical Formula 1]

TABLE 4

|  | entire Mg + Ti mole ratio | Mg mole ratio | Ti mole ratio | Discharge capacity (mAh/g) | Room temperature cycle-life (%) |
|---|---|---|---|---|---|
| Comparative Example 10 | 0.001 | 0.0005 | 0.0005 | 202 | 83 |
| Example 7 | 0.002 | 0.001 | 0.001 | 203 | 85 |
| Example 8 | 0.004 | 0.002 | 0.002 | 202 | 87 |
| Example 9 | 0.006 | 0.002 | 0.004 | 203 | 87 |
| Example 10 | 0.006 | 0.004 | 0.002 | 201 | 88 |
| Example 11 | 0.008 | 0.006 | 0.002 | 200 | 87 |
| Comparative Example 11 | 0.008 | 0.002 | 0.006 | 201 | 84 |
| Example 12 | 0.01 | 0.005 | 0.005 | 200 | 86 |
| Comparative Example 12 | 0.01 | 0.002 | 0.008 | 202 | 83 |
| Comparative Example 13 | 0.01 | 0.008 | 0.002 | 198 | 82 |
| Comparative Example 14 | 0.02 | 0.01 | 0.01 | 199 | 82 |

As shown in Table 4, the half cells respectively using the positive active material having an Mg mole ratio of 0.001 to 0.006 and a Ti mole ratio of 0.001 to 0.005 according to Examples 7 to 8, the positive active material having an Mg mole ratio of 0.0005 and a Ti mole ratio of 0.0005 according to Comparative Example 10, the positive active material having an Mg mole ratio of 0.002 and a Ti mole ratio of 0.006 according to Comparative Example 11, and the positive active material having an Mg mole ratio of 0.002 and a Ti mole ratio of 0.008 according to Comparative Example 12 showed excellent discharge capacity compared with the half-cells using the positive active material having mole ratios beyond the range according to Comparative Examples 13 and 14.

In addition, as shown in Table 4, the half cells using the positive active materials having an Mg mole ratio of 0.001 to 0.006 and a Ti mole ratio of 0.001 to 0.005 according to Examples 7 to 12 exhibited an excellent capacity retention compared with the half-cells using the positive active materials having mole ratios beyond the ranges according to Comparative Examples 10 to 12 and 14. This capacity retention improvement is a surprising effect that is generally difficult to obtain from a battery using a positive active material having a high Ni content.

As shown in Table 4, the half-cells using the positive active materials having an Mg mole ratio of 0.001 to 0.006 and a Ti mole ratio of 0.001 to 0.005 according to Examples 7 to 12 showed a discharge capacity of greater than or equal to 200 mAh/g and a capacity retention of greater than or equal to 85%. Accordingly, rechargeable lithium batteries using such positive active materials may be usefully used as a power source for a middle and large-sized hybrid or electric vehicle and the like. On the contrary, the cells using the positive active materials beyond the ranges according to Comparative Examples 10 to 14 showed discharge capacity of less than 200 mAh/g or a discharge capacity retention of less than 85% and thus, these positive active materials may not be appropriate for use for a middle and large-sized hybrid or electric vehicle requiring a long cycle life.

By way of summation and review, a rechargeable lithium battery includes a positive electrode, a negative electrode, and an electrolyte. A positive active material of a positive electrode may be an oxide consisting of lithium and a transition metal and having a structure capable of intercalating lithium ions, for example $LiCoO_2$, $LiMn_2O_4$, $LiNi_{1-x}Co_xO_2$ (0<x<1).

As for a negative active material, various carbon-based materials such as artificial graphite, natural graphite, and hard carbon, which intercalate and deintercalate lithium ions.

Recently, as mobile information terminals have been rapidly down-sized and lightened, it has become desirable for rechargeable lithium batteries as an actuating power source to have a much higher capacity. In order to use the rechargeable lithium battery as an actuating power source or as a power storage source for a hybrid vehicle or an electric vehicle, research on development of a battery having satisfactory high rate capability, being rapidly charged and discharged, and having excellent cycle characteristics is actively made.

A positive active material having a high nickel content may utilize lithium ions in a high ratio and thus may provide a high capacity. However, in a general positive active material having a high nickel content, cycle-life characteristics may deteriorate due to the high Ni content, which may cause a structural degradation compared with a positive active material having a low nickel content. According to embodiments, when the positive active material having a high nickel content further includes a divalent element $M^1$ and a tetravalent element $M^2$ as shown in Chemical Formula 1, the positive active material may have a stabilized structure, and a utilization ratio of lithium ions may be maintained. For example, capacity and thus cycle-life characteristics may be improved due to the doped divalent element of $M^1$ and tetravalent element of $M^2$. In contrast, in a positive active material having a low nickel content, Ni may have a deteriorating effect to the structure of the positive active material in a low content but Me may stabilize the structure in a relatively higher content and thus maintains the stable structure itself. In such a material, an effect of stabilizing the structure by further including the divalent element of $M^1$ and the tetravalent element of $M^2$ may be insignificant, and thus cycle-life characteristics may not be improved.

Embodiments provide a positive active material for a rechargeable lithium battery having high capacity and excellent cycle-life characteristics.

Embodiments also provide a rechargeable lithium battery including the positive active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A positive active material for a rechargeable lithium battery, the positive active material comprising:
a compound represented by Chemical Formula 1:

$$Li_aNi_xCo_yMe_zM^1_kM^2_pO_2 \qquad \text{[Chemical Formula 1]}$$

wherein,
0.9≤a≤1.1, 0.7≤x≤0.93, 0<y≤0.3, 0<z≤0.3, 0.001≤k≤0.006, 0.001≤p≤0.005, x+y+z+k+p=1, 0.002≤k+p≤0.01,
Me is Mn or Al,
$M^1$ is a divalent element, and
$M^2$ is a tetravalent element.

2. The positive active material as claimed in claim 1, wherein:
$M^1$ is Mg, Ba, or a combination thereof, and
$M^2$ is Ti, Zr, Mn, Si, or a combination thereof.

3. The positive active material as claimed in claim 1, wherein k and p are in a ratio k:p of about 2:8 to about 8:2.

4. The positive active material as claimed in claim 1, wherein a c-axis spacing in a crystal structure of the positive active material is about 14.168 Å to about 14.174 Å.

5. The positive active material as claimed in claim 1, wherein a full width at half maximum, $FWHM_{(003)}$ of a diffraction peak at a (003) plane by X-ray diffraction of the positive active material is about 0.13 to about 0.16.

6. The positive active material as claimed in claim 1, wherein $M^1$ is Mg and $M^2$ is Ti.

7. The positive active material as claimed in claim 1, wherein x is in a range of 0.8≤x≤0.9.

8. A rechargeable lithium battery, comprising
a positive electrode including the positive active material as claimed in claim 1;
a negative electrode including a negative active material; and
an electrolyte.

9. A positive active material for a rechargeable lithium battery, the positive active material comprising:
a compound represented by Chemical Formula 1:

$$Li_aNi_xCo_yMe_zM^1_kM^2_pO_2 \qquad \text{[Chemical Formula 1]}$$

wherein,
0.9≤a≤1.1, 0.7≤x≤0.93, 0<y≤0.3, 0<z≤0.3, 0.001≤k≤0.006, 0.001≤p≤0.005, x+y+z+k+p=1,
k and p are in a ratio k:p of about 2:8 to about 8:2,
Me is Mn or Al,
$M^1$ is a divalent element, and
$M^2$ is a tetravalent element.

10. A positive active material for a rechargeable lithium battery, the positive active material comprising:
a compound represented by Chemical Formula 1:

$$Li_aNi_xCo_yMe_zM^1_kM^2_pO_2 \qquad \text{[Chemical Formula 1]}$$

wherein, 0.9≤a≤1.1, 0.8≤x≤0.9, 0<y≤0.3, 0<z≤0.3, 0.001≤k≤0.006, 0.001≤p≤0.005, x+y+z+k+p=1,
Me is Mn or Al,
$M^1$ is a divalent element, and
$M^2$ is a tetravalent element.

* * * * *